US010605156B2

(12) United States Patent
Saeki

(10) Patent No.: US 10,605,156 B2
(45) Date of Patent: Mar. 31, 2020

(54) EXHAUST STRUCTURE FOR INTERNAL COMBUSTION ENGINE

(71) Applicant: TOYOTA JIDOSHA KABUSHIKI KAISHA, Toyota-shi (JP)

(72) Inventor: Masanori Saeki, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/223,163

(22) Filed: Dec. 18, 2018

(65) Prior Publication Data
US 2019/0218962 A1 Jul. 18, 2019

(30) Foreign Application Priority Data

Jan. 16, 2018 (JP) .................... 2018-004846

(51) Int. Cl.
F02B 37/18 (2006.01)
F01N 3/10 (2006.01)
F01N 3/28 (2006.01)
F02B 37/02 (2006.01)
F02B 77/08 (2006.01)

(52) U.S. Cl.
CPC ............ F02B 37/18 (2013.01); F01N 3/10 (2013.01); F01N 3/28 (2013.01); F02B 37/02 (2013.01); F02B 77/086 (2013.01); F01N 2560/02 (2013.01); F01N 2560/025 (2013.01)

(58) Field of Classification Search
CPC ........ F02B 37/02; F02B 37/025; F02B 37/18; F02B 37/183; F02B 37/186; F02B 77/086; F01N 3/10; F01N 3/101–108; F01N 2560/02; F01N 2560/025; Y02T 10/144
See application file for complete search history.

(56) References Cited

U.S. PATENT DOCUMENTS

2011/0126812 A1* 6/2011 Miyashita ............. F01N 13/107
123/703
2016/0084152 A1* 3/2016 Fujioka .................. F02B 37/183
60/602

(Continued)

FOREIGN PATENT DOCUMENTS

DE 102007021763 A1 * 11/2007 ........... F01N 13/008
JP 2007247560 A * 9/2007 ............ F02B 37/183

(Continued)

Primary Examiner — Mark A Laurenzi
Assistant Examiner — Jessica L Kebea
(74) Attorney, Agent, or Firm — Oblon, McClelland, Maier & Neustadt, L.L.P.

(57) ABSTRACT

A turbine housing includes an accommodation space that accommodates a turbine wheel, a discharge passage connected to the accommodation space, and a bypass passage that extends from the scroll passage bypassing the accommodation space and is connected to the discharge passage. The bypass passage extends so that an end surface on an upstream side of the catalytic device is located on a center axis of the bypass passage. An air-fuel ratio sensor is located closer to a center axis of the accommodation space than the center axis of the bypass passage. A protuberance that protrudes from an inner wall surface of the discharge passage is located between the accommodation space and the air-fuel ratio sensor. The protuberance protrudes toward the center axis of the accommodation space.

3 Claims, 1 Drawing Sheet

(56) References Cited

U.S. PATENT DOCUMENTS

| | | | | |
|---|---|---|---|---|
| 2017/0314493 A1* | 11/2017 | Yoeda | ................... | F02B 37/183 |
| 2018/0252142 A1* | 9/2018 | Kubota | ................ | F01N 3/2006 |
| 2019/0010854 A1* | 1/2019 | Kimura | ................ | F02B 37/183 |
| 2019/0063284 A1* | 2/2019 | Santillo | ................ | F01N 11/007 |
| 2019/0249596 A1* | 8/2019 | Ito | ....................... | F02D 41/0007 |

FOREIGN PATENT DOCUMENTS

| | | | | | |
|---|---|---|---|---|---|
| JP | 2012225297 | A | * | 11/2012 | |
| JP | 2012233462 | A | * | 11/2012 | |
| JP | 2012241545 | A | * | 12/2012 | |
| JP | 2013-024205 | | | 2/2013 | |
| JP | 2014202163 | A | * | 10/2014 | |
| WO | WO-2014188245 | A2 | * | 11/2014 | ........... F01D 17/105 |

* cited by examiner

EXHAUST STRUCTURE FOR INTERNAL COMBUSTION ENGINE

BACKGROUND

The present invention relates to an exhaust structure for an internal combustion engine.

Japanese Laid-Open Patent Publication No. 2013-24205 discloses an exhaust structure for an internal combustion engine. The exhaust structure includes a turbine housing of a turbocharger located in the middle of an exhaust passage. The turbine housing defines an accommodation space accommodating the turbine wheel and includes a scroll passage through which exhaust gas is drawn into the accommodation space. The turbine housing also includes a discharge passage through which exhaust gas is discharged from the accommodation space. The discharge passage is connected to the accommodation space. In addition, the turbine housing includes a bypass passage. The bypass passage bypasses the accommodation space to connect the scroll passage and the discharge passage.

An air-fuel ratio sensor that detects an air-fuel ratio (partial pressure of oxygen) in the exhaust passage is attached to the turbine housing. The air-fuel ratio sensor includes a distal end that projects into the discharge passage to detect an air-fuel ratio. The distal end of the air-fuel ratio sensor is located closer to the center axis of the bypass passage than the center axis of the accommodation space.

In the exhaust structure, the distal end of the air-fuel ratio sensor is located in the proximity of the bypass passage. Thus, exhaust gas discharged from the bypass passage greatly affects the air-fuel ratio detected by the air-fuel ratio sensor. However, in order to accurately detect the air-fuel ratio of exhaust gas in the entire exhaust passage, both the air-fuel ratio of exhaust gas discharged from the bypass passage and the air-fuel ratio of exhaust gas discharged from the accommodation space of the turbine wheel need to be reflected on the air-fuel ratio detected by the air-fuel ratio sensor.

SUMMARY

To solve the above-described problem, an exhaust structure for an internal combustion engine according to a first aspect of the present invention is provided. The internal combustion engine includes a turbocharger and a catalytic device that purifies exhaust gas. The turbocharger includes a turbine housing located on an exhaust passage. The catalytic device is located on a downstream side of the turbine housing in the exhaust passage. The exhaust structure includes an accommodation space, a scroll passage, a discharge passage, a bypass passage, and an air-fuel ratio sensor. The accommodation space is included in the turbine housing to accommodate a turbine wheel. The scroll passage is included in the turbine housing to be connected to the accommodation space. The scroll passage extends in an arcuate manner so as to surround the accommodation space from an outer side. The discharge passage is included in the turbine housing to be connected to the accommodation space. Exhaust gas is discharged through the discharge passage from the accommodation space. The bypass passage is included in the turbine housing. The bypass passage bypasses the accommodation space to connect the scroll passage and the discharge passage. The air-fuel ratio sensor is located on a downstream side of the accommodation space and on an upstream side of the catalytic device. The air-fuel ratio sensor detects an air-fuel ratio of the exhaust gas. The bypass passage extends so that an end surface on the upstream side of the catalytic device is located on a center axis of the bypass passage. The air-fuel ratio sensor is located closer to a center axis of the accommodation space than the center axis of the bypass passage. A protuberance protrudes from an inner wall surface of the discharge passage. The protuberance is located between the accommodation space and the air-fuel ratio sensor. The protuberance protrudes toward the center axis of the accommodation space.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

An exhaust structure for an internal combustion engine according to an embodiment will now be described with reference to the drawings. First, the schematic structure of an internal combustion engine 100 will be described. In the explanation of the exhaust structure for the internal combustion engine 100, the vertical direction with the internal combustion engine 100 installed in a vehicle is defined as an up-down direction, and the upstream side and the downstream side in a direction in which exhaust gas flows are respectively defined as the front side and the rear side.

Figure 1:
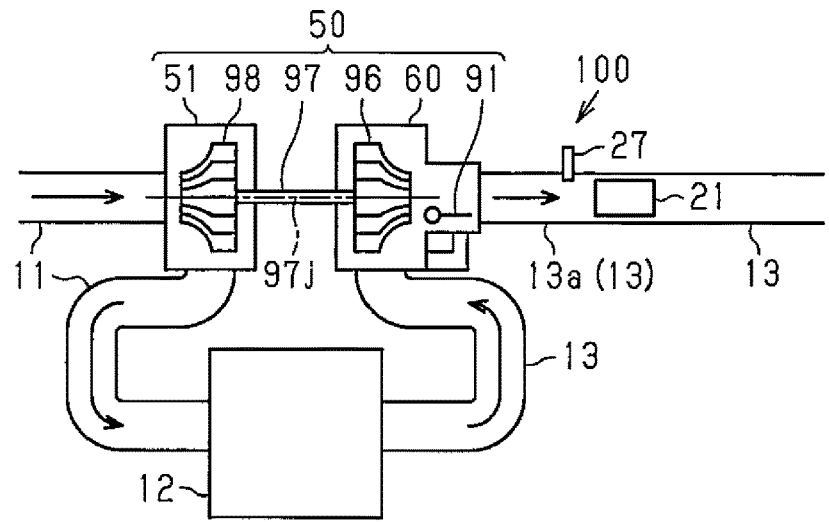
FIG. 1 is a schematic view showing an internal combustion engine.

As shown in FIG. 1, the internal combustion engine 100 includes an intake passage 11, through which intake air is drawn from the outside. The intake passage 11 is connected to a cylinder 12, in which a mixture of fuel and intake air is burned. The cylinder 12 is connected to an exhaust passage 13, from which exhaust gas is discharged.

The internal combustion engine 100 includes a turbocharger 50 that compresses intake air. The turbocharger 50 is located between the intake passage 11 and the exhaust passage 13. The turbocharger 50 includes a compressor housing 51 located on the intake passage 11 and a turbine housing 60 located on the exhaust passage 13. The compressor housing 51 accommodates a compressor wheel 98. The turbine housing 60 accommodates a turbine wheel 96. The compressor wheel 98 is fixed to one end of a coupling shaft 97, and the turbine wheel 96 is fixed to the other end of the coupling shaft 97. This causes the compressor wheel 98 and the turbine wheel 96 to rotate about a center axis 97$j$ of the coupling shaft 97. The turbine wheel 96 rotates by means of the flow of exhaust gas. As the turbine wheel 96 rotates, the compressor wheel 98 rotates. This causes intake air to be compressed and then delivered to the cylinder 12.

The internal combustion engine 100 includes a catalytic device 21 that purifies exhaust gas. The catalytic device 21 is located downstream of the turbine housing 60 in the exhaust passage 13. The catalytic device 21 is columnar and extends in the same direction as the exhaust passage 13, which is located downstream of the turbine housing 60. Further, the internal combustion engine 100 includes an air-fuel ratio sensor 27 that detects the air-fuel ratio of exhaust gas. The air-fuel ratio sensor 27 is located at a catalyst upstream part 13a of the exhaust passage 13, which is located downstream of the turbine housing 60 and upstream of the catalytic device 21.

The structure of the exhaust passage 13 located around the turbine housing 60 will now be described in more detail.

Figure 2:
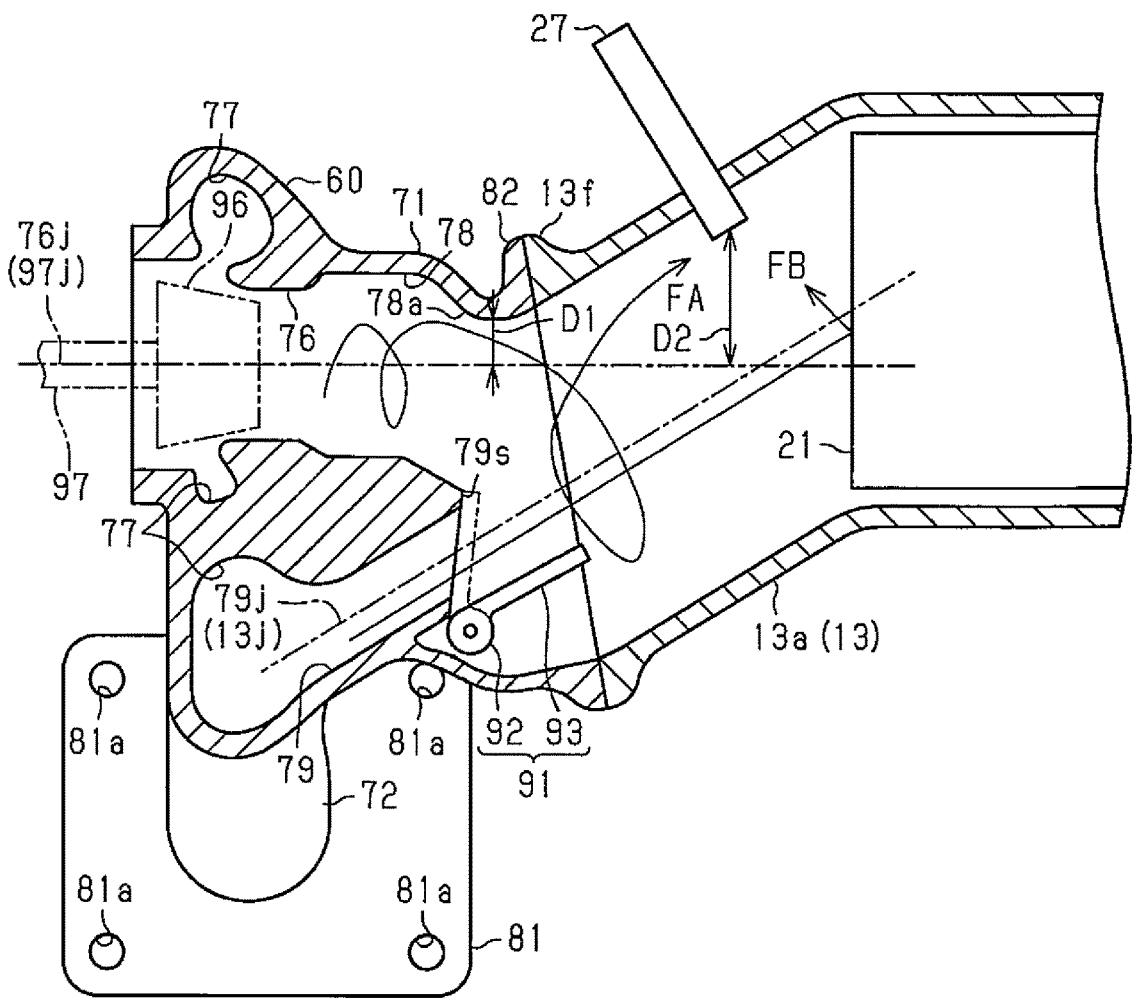
FIG. 2 is a cross-sectional view showing an exhaust passage located around a turbine housing.

As shown in FIG. 2, the turbine housing 60 includes a columnar portion 71 and an arc portion 72 extending so as to surround the outer circumference of the columnar portion 71. The arc portion 72 is located at the front end (left side in FIG. 2) of the columnar portion 71. The arc portion 72 extends along an arc as viewed from an axial direction of the columnar portion 71. The arc portion 72 includes an end (lower end in FIG. 2) jutting out in a tangential direction of the outer circle of the columnar portion 71.

The columnar portion 71 includes an accommodation space 76 that is substantially columnar and accommodates the turbine wheel 96. The accommodation space 76 extends along a center axis 97j of the coupling shaft 97. The accommodation space 76 includes a center axis 76j coinciding with the center axis 97j of the coupling shaft 97. The center axis 76j of the accommodation space 76 extends in a direction that is substantially orthogonal to the up-down direction. The accommodation space 76 extends to the front end of the columnar portion 71 and opens in the front end of the columnar portion 71.

The arc portion 72 includes a scroll passage 77 connected to the accommodation space 76. The scroll passage 77 extends so as to surround the accommodation space 76. The scroll passage 77 extends spirally along an arc as viewed from an axial direction of the accommodation space 76. The central part of the spiral of the scroll passage 77 extends to the columnar portion 71 and is connected to the accommodation space 76. The outer portion of the spiral of the scroll passage 77 extends to the end (lower end in FIG. 2) of the arc portion 72 and opens in the end of the arc portion 72.

An upstream flange 81 bulges from the end of the arc portion 72 toward the outer side of the scroll passage 77. The upstream flange 81 has bolt holes 81a. Each bolt hole 81a extends through the upstream flange 81 in the thickness-wise direction. Bolts (not shown) are inserted through the bolt holes 81a of the upstream flange 81 to fix the upstream flange 81 to the exhaust passage 13, which is located upstream of the turbine housing 60.

The columnar portion 71 includes a discharge passage 78 connected to the accommodation space 76. The discharge passage 78 extends in the axial direction of the accommodation space 76. The discharge passage 78 extends to the rear end (right side in FIG. 2) of the columnar portion 71 and opens in the rear end of the columnar portion 71. The discharge passage 78 has a larger cross-sectional flow area than other sections in the proximity of the rear end of the columnar portion 71. In addition, the discharge passage 78 is located below the accommodation space 76 in the proximity of the rear end of the columnar portion 71.

A downstream flange 82 bulges from the rear end of the columnar portion 71 toward the radially outer side of the columnar portion 71. In addition, a flange 13f bulges from the wall of the exhaust passage 13, which is located downstream of the turbine housing 60, toward the radially outer side of the exhaust passage 13. The turbine housing 60 is fixed to the exhaust passage 13, which is located downstream of the turbine housing 60, with the downstream flange 82 in contact with the flange 13f.

The columnar portion 71 and the arc portion 72 include a bypass passage 79 that bypasses the accommodation space 76 to connect the scroll passage 77 and the discharge passage 78. The bypass passage 79 is located below the accommodation space 76 and extends substantially straight. The bypass passage 79 is connected to the discharge passage 78, which is located in the proximity of the rear end of the columnar portion 71 and located below the accommodation space 76. The bypass passage 79 includes a center axis 79j inclined so as to be closer to the center axis 76j of the accommodation space 76 toward the downstream side of the bypass passage 79. With the turbine housing 60 fixed to the exhaust passage 13, the bypass passage 79 extends so that the substantially central part of the end surface on the upstream side of the catalytic device 21 is located on the center axis 79j.

A wastegate 91 that opens and closes the bypass passage 79 is provided in the discharge passage 78. The wastegate 91 includes a shaft 92. The shaft 92 includes a first end, which is the end located on the rear side of the plane of FIG. 2, rotationally supported by the wall of the discharge passage 78 of the turbine housing 60. The shaft 92 includes a second end, which is the end located on the front side of the plane of FIG. 2. A valve plate 93, which is substantially plate-shaped, projects from the second end toward the radially outer side of the shaft 92. As shown by the long dashed double-short dashed line in FIG. 2, rotation of the shaft 92 in the counterclockwise direction in FIG. 2 causes the valve plate 93 to abut an abutting surface 79s located at a downstream end of the bypass passage 79. In this manner, the wastegate 91 closes the bypass passage 79. In contrast, as shown by the solid line in FIG. 2, rotation of the shaft 92 in the clockwise direction in FIG. 2 causes the valve plate 93 to move away from the abutting surface 79s. In this manner, the wastegate 91 opens the bypass passage 79.

The catalyst upstream part 13a includes a center axis 13j that is parallel to the center axis 79j of the bypass passage 79 and coincides with the center axis 79j of the bypass passage 79. That is, the center axis 13j of the catalyst upstream part 13a and the center axis 79j of the bypass passage 79 are inclined with respect to the center axis 76j of the accommodation space 76.

The air-fuel ratio sensor 27 is attached to the catalyst upstream part 13a. The air-fuel ratio sensor 27 is located above the center axis 13j of the catalyst upstream part 13a. The air-fuel ratio sensor 27 is located closer to the center axis 76j of the accommodation space 76 than the center axis 79j of the bypass passage 79. The air-fuel ratio sensor 27 is substantially bar-shaped. The air-fuel ratio sensor 27 includes a distal end that projects into the exhaust passage 13 to detect the air-fuel ratio of exhaust gas.

The discharge passage 78 has a protuberance 78a that protrudes from the inner wall surface and is located between the accommodation space 76 and the air-fuel ratio sensor 27. The protuberance 78a protrudes toward the center axis 76j of the accommodation space 76. The protuberance 78a is located above the center axis 76j of the accommodation space 76 and in the proximity of the rear end (right side in FIG. 2) of the columnar portion 71. The protuberance 78a protrudes to be closer to the center axis 76j of the accommodation space 76 from the accommodation space 76 toward the rear end of the columnar portion 71. The protruding amount of the protuberance 78a is slightly small in the proximity of the rear end of the columnar portion 71. The peak of the protuberance 78a is located closer to the center axis 76j of the accommodation space 76 than the distal end of the air-fuel ratio sensor 27. That is, the shortest distance D1 from the peak of the protuberance 78a to the center axis 76j of the accommodation space 76 is shorter than the shortest distance D2 from the distal end of the air-fuel ratio sensor 27 to the center axis 76*j* of the accommodation space 76.

The protuberance 78*a* includes a curved inner surface. Thus, the protuberance 78*a* is smoothly connected to the inner surface of the catalyst upstream part 13*a* located above the center axis 13*j*.

The operation of the present embodiment will now be described.

Exhaust gas discharged from the cylinder 12 flows through the exhaust passage 13, which is located upstream of the turbine housing 60, and then into the scroll passage 77 of the turbine housing 60. Some of the exhaust gas that has flowed into the scroll passage 77 flows into the accommodation space 76. The exhaust gas flowing from the scroll passage 77 to the accommodation space 76 rotates the turbine wheel 96. As shown by arrow FA in FIG. 2, the exhaust gas changes into a swirling flow about the center axis 76*j* of the accommodation space 76 and is discharged from the accommodation space 76 to the discharge passage 78. The exhaust gas discharged from the accommodation space 76 flows through the discharge passage 78 into the catalyst upstream part 13*a*.

The air-fuel ratio sensor 27 is located closer to the center axis 76*j* (upper side in FIG. 2) of the accommodation space 76 than the center axis 79*j* of the bypass passage 79. The exhaust gas discharged from the accommodation space 76 flows toward the air-fuel ratio sensor 27. The protuberance 78*a* is located between the accommodation space 76 and the air-fuel ratio sensor 27. The protuberance 78*a* blocks the flow of some of the exhaust gas, which is discharged from the accommodation space 76 to reach the air-fuel ratio sensor 27. In particular, since the peak of the protuberance 78*a* is located closer to the center axis 76*j* of the accommodation space 76 than the distal end of the air-fuel ratio sensor 27, the protuberance 78*a* directly blocks the flow of the exhaust gas that reaches the air-fuel ratio sensor 27 from the accommodation space 76. Since the exhaust gas discharged from the accommodation space 76 is a swirling flow, some of the exhaust gas goes around the protuberance 78*a* and then reaches the air-fuel ratio sensor 27.

Some of the exhaust gas flowing through the scroll passage 77 flows into the bypass passage 79. When the valve plate 93 of the wastegate 91 opens, the bypass passage 79 opens. In this case, the exhaust gas flows from the bypass passage 79 into the discharge passage 78 and further flows toward the catalyst upstream part 13*a*. As shown by arrow FB in FIG. 2, the exhaust gas flows generally straight toward the catalytic device 21. As a result, the exhaust gas strikes the end surface on the upstream side of the catalytic device 21 and then diffuses. In this manner, some of the exhaust gas flows toward the upper side of the catalyst upstream part 13*a* and then reaches the air-fuel ratio sensor 27.

The advantages of the present embodiment will now be described.

(1) Exhaust gas discharged from the bypass passage 79 strikes the end surface on the upstream side of the catalytic device 21 and then reaches the air-fuel ratio sensor 27. Thus, the air-fuel ratio of exhaust gas from the bypass passage 79 is properly reflected on the air-fuel ratio detected by the air-fuel ratio sensor 27. Further, the flow of exhaust gas discharged from the accommodation space 76 is partially blocked by the protuberance 78*a*. Thus, the influence of the exhaust gas from the accommodation space 76 on the air-fuel ratio of exhaust gas detected by the air-fuel ratio sensor 27 is not excessively large. The exhaust gas discharged from the accommodation space 76 goes around the protuberance 78*a* and then reaches the air-fuel ratio sensor 27. Thus, the air-fuel ratio of exhaust gas from the accommodation space 76 is properly reflected on the air-fuel ratio detected by the air-fuel ratio sensor 27. In this manner, the air-fuel ratio of exhaust gas from the bypass passage 79 and the accommodation space 76 is properly reflected on the air-fuel ratio detected by the air-fuel ratio sensor 27. This allows for accurate detection of the air-fuel ratio of exhaust gas in the entire exhaust passage 13.

(2) When exhaust gas discharged from the bypass passage 79 strikes the end surface on the upstream side of the catalytic device 21, moisture contained in the exhaust gas causes condensation to easily occur on the end surface on the upstream side of the catalytic device 21. Consequently, the moisture is removed from the exhaust gas. This limits situations in which the air-fuel ratio sensor 27 gets wet by the exhaust gas from the bypass passage 79.

(3) In some cases, exhaust gas contains fine water droplets as moisture. Since exhaust gas discharged from the accommodation space 76 is a swirling flow, water droplets contained in the exhaust gas collect on the wall surfaces of the discharge passage 78 and the catalyst upstream part 13*a* due to centrifugal force. Further, a swirling flow causes exhaust gas to strike the wall surfaces of the discharge passage 78 and the catalyst upstream part 13*a* more easily than a straight flow. Thus, moisture contained in exhaust gas causes condensation to easily occur on these wall surfaces. In addition, some of the exhaust gas discharged from the accommodation space 76 flows substantially straight and therefore strikes the protuberance 78*a*, which is located between the accommodation space 76 and the air-fuel ratio sensor 27. The moisture contained in the exhaust gas causes condensation to occur on the surface of the protuberance 78*a*. In this manner, before the exhaust gas reaches the air-fuel ratio sensor 27, the moisture contained in the exhaust gas discharged from the accommodation space 76 is removed. This limits situations in which the air-fuel ratio sensor 27 gets wet by exhaust gas from the accommodation space 76.

(4) The moisture condensed on the wall surfaces of the discharge passage 78 and the catalyst upstream part 13*a* and on the end surface on the upstream side of the catalytic device 21 runs on the wall surfaces and the end surface to flow downward through the exhaust passage 13. In addition, since the air-fuel ratio sensor 27 is located above the center axis 13*j* of the catalyst upstream part 13*a*, adverse effects resulting from the condensed water on the air-fuel ratio sensor 27 are reduced.

(5) The protuberance 78*a* includes a curved surface smoothly connected to the wall surface of the catalyst upstream part 13*a*. If the protuberance 78*a* and the boundary of the protuberance 78*a* and the catalyst upstream part 13*a* include a step or sharp edge, the flow direction of exhaust gas from the accommodation space 76 is suddenly changed by the step or edge. This produces irregular eddies and therefore produces resistance to the flow of the exhaust gas. In this regard, the protuberance 78*a* having the above-described shape never causes excessive resistance to the flow of exhaust gas from the accommodation space 76.

It should be apparent to those skilled in the art that the present invention may be embodied in many other specific forms without departing from the spirit or scope of the invention. Particularly, it should be understood that the present invention may be embodied in the following forms.

The protruding degree of the protuberance 78*a* may be changed. That is, the protuberance 78*a* simply needs to protrude toward the center axis 76*j* of the accommodation space 76. Thus, the peak of the protuberance 78*a* does not necessarily have to be located closer to the center axis 76j of the accommodation space 76 than the distal end of the air-fuel ratio sensor 27. As long as the protuberance 78a protrudes toward the center axis 76j of the accommodation space 76, the flow of exhaust gas from the accommodation space 76 to the air-fuel ratio sensor 27 can be significantly blocked.

As long as the protuberance 78a is located between the accommodation space 76 and the air-fuel ratio sensor 27, the protuberance 78a may be located at any position of the discharge passage 78. For example, the protuberance 78a may be located at the middle of the discharge passage 78 in the axial direction or located between the middle of the discharge passage 78 and the accommodation space 76.

As long as the air-fuel ratio sensor 27 is located closer to the center axis 76j of the accommodation space 76 than the center axis 79j of the bypass passage 79, the air-fuel ratio sensor 27 may be located at any position in the turbine housing 60. For example, the air-fuel ratio sensor 27 may be arranged on the discharge passage 78. In this case, the protuberance 78a is located between the air-fuel ratio sensor 27 and the accommodation space 76 in the discharge passage 78.

As long as at least part of the end surface on the upstream side of the catalytic device 21 is located on the center axis 79j of the bypass passage 79, the axial direction of the bypass passage 79 may be changed. The center axis 79j of the bypass passage 79 may be parallel to the center axis 76j of the accommodation space 76.

In the same manner, the axial direction of the catalyst upstream part 13a may be changed as long as the condition of the axial direction of the bypass passage 79 is satisfied.

The discharge passage 78 simply needs to be connected to the accommodation space 76 and the bypass passage 79 and to open in the rear end of the columnar portion 71. The cross-sectional flow area of the discharge passage 78 does not have to be large at the rear end of the columnar portion 71.

The center axis 76j of the accommodation space 76 may be inclined at any angle with respect to the up-down direction (vertical direction) with the internal combustion engine 100 installed in a vehicle. Even in this case, when the bypass passage 79 is located below the accommodation space 76, the air-fuel ratio sensor 27 is located closer to the center axis 76j of the accommodation space 76 than the center axis 79j of the bypass passage 79. Thus, the air-fuel ratio sensor 27 is located above the center axis 13j at the catalyst upstream part 13a. Accordingly, the above-described advantage (4) is obtained. Furthermore, the turbine housing 60 with the internal combustion engine 100 installed in a vehicle may be oriented in any direction as long as the bypass passage 79 extends so that at least part of the end surface on the upstream side of the catalytic device 21 is located on the center axis 79j of the bypass passage 79, the air-fuel ratio sensor 27 is located closer to the center axis 76j of the accommodation space 76 than the center axis 79j of the bypass passage 79, and the protuberance 78a is located between the accommodation space 76 and the air-fuel ratio sensor 27. That is, the center axis 76j of the accommodation space 76 may be oriented in any direction, and the accommodation space 76 and the bypass passage 79 may have any positional relationship in the up-down direction. The accommodation space 76 and the bypass passage 79 may be lined in the horizontal direction. As long as the axial direction of the bypass passage 79, the location of the air-fuel ratio sensor 27, and the location of the protuberance 78a are set in the above-described manner, the above-described advantages (1), (2), and (3) are obtained.

Therefore, the present examples and embodiments are to be considered as illustrative and not restrictive and the invention is not to be limited to the details given herein, but may be modified within the scope and equivalence of the appended claims.

The invention claimed is:

1. An exhaust structure for an internal combustion engine, the internal combustion engine including a turbocharger and a catalytic device that purifies exhaust gas, wherein the turbocharger includes a turbine housing located on an exhaust passage, and the catalytic device is located on a downstream side of the turbine housing in the exhaust passage, the exhaust structure comprising:
an accommodation space included in the turbine housing to accommodate a turbine wheel;
a scroll passage included in the turbine housing to be connected to the accommodation space, wherein the scroll passage extends in an arcuate manner so as to surround the accommodation space from an outer side;
a discharge passage included in the turbine housing to be connected to the accommodation space, wherein exhaust gas is discharged through the discharge passage from the accommodation space;
a bypass passage included in the turbine housing, wherein the bypass passage bypasses the accommodation space to connect the scroll passage and the discharge passage; and
an air-fuel ratio sensor located on a downstream side of the accommodation space and on an upstream side of the catalytic device, wherein the air-fuel ratio sensor detects an air-fuel ratio of the exhaust gas, wherein
the bypass passage extends so that an end surface on the upstream side of the catalytic device is located on a center axis of the bypass passage,
the air-fuel ratio sensor is located closer to a center axis of the accommodation space than the center axis of the bypass passage,
a protuberance protrudes from an inner wall surface of the discharge passage, wherein the protuberance is located between the accommodation space and the air-fuel ratio sensor, and
the protuberance protrudes toward the center axis of the accommodation space.

2. The exhaust structure according to claim 1, wherein the air-fuel ratio sensor includes a distal end that projects into the exhaust passage, and
a peak of the protuberance is located closer to the center axis of the accommodation space than the distal end of the air-fuel ratio sensor.

3. The exhaust structure according to claim 1, wherein when a vertical direction with the internal combustion engine installed in a vehicle is defined as an up-down direction, the bypass passage is located below the accommodation space.

* * * * *